United States Patent
Kupper et al.

(10) Patent No.: US 6,871,734 B2
(45) Date of Patent: Mar. 29, 2005

(54) MOTOR VEHICLE WITH OVERSPEED PROTECTOR FOR THE PRIME MOVER

(75) Inventors: Klaus Kupper, Buhl (DE); Klaus Henneberger, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/690,407

(22) Filed: Oct. 20, 2003

(65) Prior Publication Data

US 2004/0079608 A1 Apr. 29, 2004

Related U.S. Application Data

(63) Continuation of application No. PCT/DE02/01398, filed on Apr. 15, 2002.

(30) Foreign Application Priority Data

Apr. 23, 2001 (DE) .......................................... 101 19 749

(51) Int. Cl.[7] .............................................. F16D 48/06
(52) U.S. Cl. ..................... 192/3.55; 192/3.61; 192/3.63; 192/104 R
(58) Field of Search .............................. 192/3.52, 3.55, 192/3.61, 3.63, 103 R, 104 R; 477/80, 86; 74/336 R

(56) References Cited

U.S. PATENT DOCUMENTS

| | | | | |
|---|---|---|---|---|
| 5,323,318 A | * | 6/1994 | Hasegawa et al. | 701/57 |
| 5,819,585 A | * | 10/1998 | Darnell | 74/335 |
| 6,009,768 A | * | 1/2000 | Hoshiya et al. | 74/336 R |
| 6,061,619 A | * | 5/2000 | Schmitz et al. | 701/51 |
| 6,679,134 B2 | * | 1/2004 | Shigyo | 74/336 R |

FOREIGN PATENT DOCUMENTS

| | | |
|---|---|---|
| DE | 43 26 862 A1 | 3/1994 |
| DE | 197 45 677 A1 | 5/1999 |
| JP | 8-312687 A1 | 11/1996 |
| JP | 11-37283 A1 | 2/1999 |

OTHER PUBLICATIONS

Patent Abstracts of Japan, vol. 1997, No. 03, Mar. 31, 1997 & JP 08 312687 A, Nov. 26, 1996, abstract.

Patent Abstracts of Japan, vol. 1999, No. 05, May 31, 1999 & JP 11 037283 A, Feb. 12, 1999, abstract.

* cited by examiner

*Primary Examiner*—Saul Rodriguez
(74) *Attorney, Agent, or Firm*—Darby & Darby

(57) ABSTRACT

The invention pertains to a motor vehicle with overspeed protector. The clutch in the power train of the motor vehicle can be operated in dependency upon the engine speed in such a way that it is disengaged or operates with slip when the engine speed exceeds a preselected limit while the clutch is engaged. The threshold value of the engine speed is ascertained on the basis of the prevailing (instantaneous) engine speed and the prevailing (instantaneous) or desired increase of transmission ratio. Gear shifting errors and overspeeding of the vehicle are thus prevented in a manner which is more reliable than by following prior proposals.

6 Claims, 1 Drawing Sheet

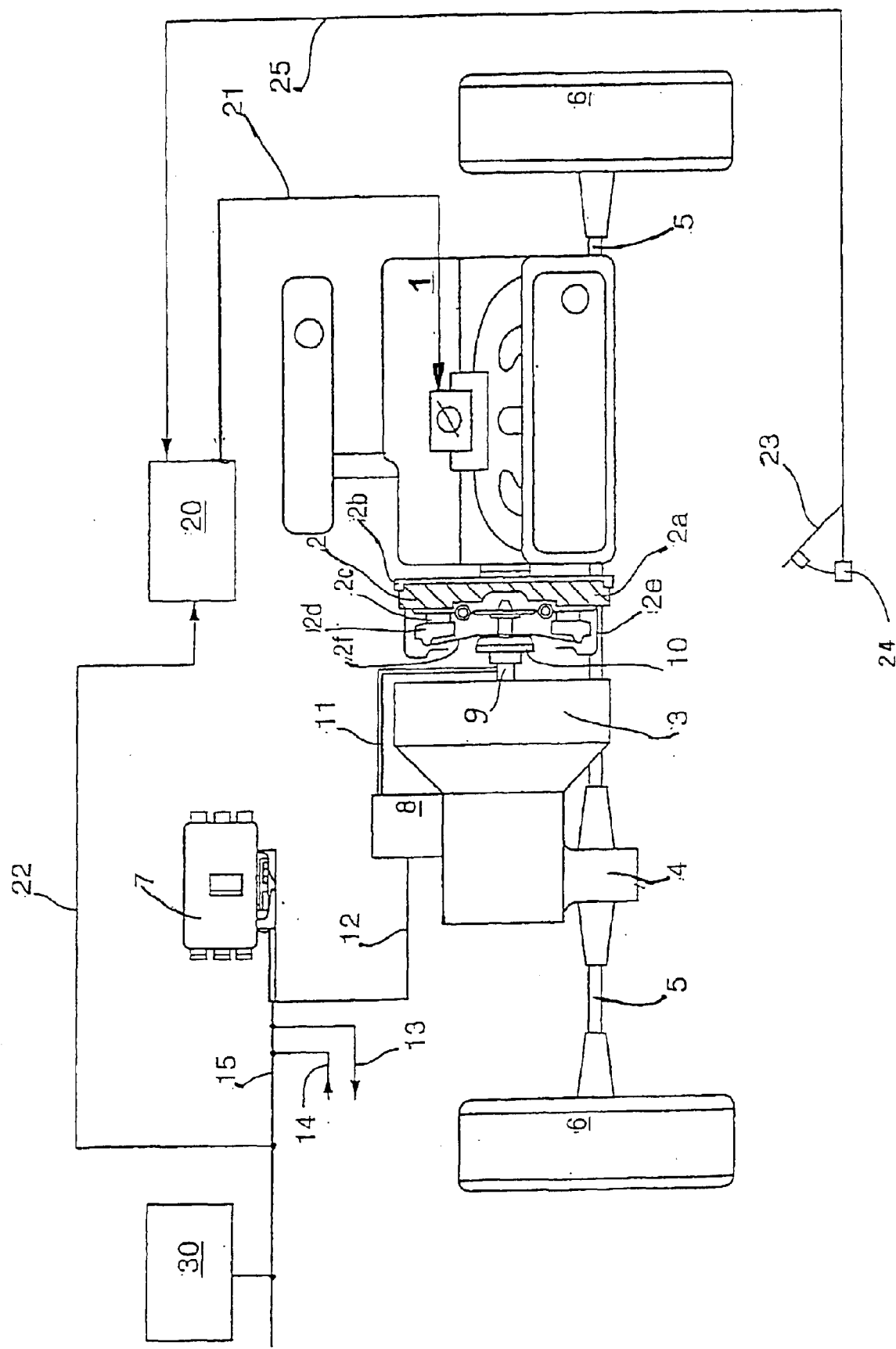

US 6,871,734 B2

MOTOR VEHICLE WITH OVERSPEED PROTECTOR FOR THE PRIME MOVER

CROSS-REFERENCE TO RELATED APPLICATION

This application is a continuation of International Patent Application No. PCT/DE02/01398, filed Apr. 15, 2002, and which claims priority of German Patent Application No. 101 19 749.7, filed Apr. 23, 2001. The International Application was published in German on Oct. 31, 2002 as WO 02/086343 A1 under PCT Article 21(2).

BACKGROUND OF THE INVENTION

The invention relates to improvements in power trains for motor vehicles, and more particularly to improvements in power trains with overspeed protection wherein the clutch is operated in dependency upon the rotational speed of the prime mover and is automatically disengaged or operates with slip when the RPM of the prime mover (such as an internal combustion engine) exceeds a preselectable threshold value during engagement of the clutch.

German patent No. 197 45 677 C2 discloses a motor vehicle wherein the prime mover is operatively connected with an automatically actuatable clutch in such a way that the engagement of the clutch is regulated in dependency upon the rotational speed of the prime mover and of the clutch plate or clutch disc. The rotational speed of the prime mover is monitored in order to ascertain whether or not it exceeds or drops below predetermined upper and lower limits The clutch is disengaged automatically, or is operated with slip, when the rotational speed of the prime mover exceeds the upper limit or drops below the lower limit.

The just described prior proposal exhibits several drawbacks. Thus, if the power train of the motor vehicle employs an automated transmission, a malfunctioning of the actuator for the transmission and/or improper operation of the clutch regulating or actuating means and/or a defectiveness of the system which monitors the selected gear of the transmission causes the transmission to automatically shift into a lower gear in lieu of shifting into a higher gear, and such undesirable shifting is not signaled to the operator of the motor vehicle. If the undesirable shifting of the transmission into a lower gear remains unnoticed, the clutch remains engaged until the indicator of the speed of the prime mover detects the resultant overspeeding of the prime mover. The next step involves a disengagement of the clutch. However, and depending upon the dynamics of the clutch engaging system, even a short-lasting temporary overrevving of the prime mover can entail extensive damage thereto. Furthermore, an overspeeding of the prime mover can result (at least under certain circumstances) in the application of excessive braking torque to the wheels of the motor vehicle.

OBJECTS OF THE INVENTION

An important object of the present invention is to provide a motor vehicle with a power train wherein the arrangement which is to protect the prime mover against overspeeding does not exhibit the aforediscussed drawbacks of conventional overspeed protection systems.

Another object of this invention is to provide a power train wherein the disengagement of the clutch and/or an operation of the clutch with slip can be effected in response to a preselected rotational speed of the prime mover.

A further object of the invention is to provide a power train with a novel and improved clutch operating arrangement.

An additional object of the instant invention is to provide a novel and improved method of avoiding or reducing the likelihood of damage to the prime mover in the power train of a motor vehicle as a result of overspeeding.

Still another object of the invention is to prevent the application of excessive braking torque to the wheels of a motor vehicle wherein the power train is equipped with a system for preventing an overspeeding of the prime mover, such as an internal combustion engine or a hybrid drive.

A further object of the invention is to provide a novel and improved arrangement of control units for use in the power train of a motor vehicle.

Another object of the present invention is to provide a novel and improved overspeed protection arrangement which can be put to use in existing types of motor vehicles.

An additional object of the invention is to provide a novel and improved overspeed protection arrangement for the prime movers of motor vehicles wherein a preselectable speed of the prime mover can be utilized as a threshold value for automatic disengagement of the clutch and/or for automatic operation of the clutch with slip.

SUMMARY OF THE INVENTION

One feature of the present invention resides in the provision of a wheeled motor vehicle which comprises a variable-RPM prime mover, a transmission having a plurality of gear ratios, a torque transmitting clutch which is installed between the prime mover and the transmission and is engageable in dependency upon the RPM of the prime mover, and control means for preventing overrevving of the prime mover. The control means includes means for effecting a disengagement of the clutch or the operation of the clutch with slip when the RPM of the prime mover exceeds a preselectable threshold value, and such threshold value is ascertained on the basis of at least one of (a) the momentary speed of the motor vehicle, the RPM of the wheels of the motor vehicle and a parameter which denotes the momentary speed of the vehicle, and (b) a signal representing one of the momentary and sought-after (desired) ratios of the transmission.

The control means can further include means for ascertaining the momentary ratio of the transmission on the basis of the previously selected ratio.

The sought-after transmission ratio is or can be one of the ratios immediately adjacent the previously selected effective ratio.

The prime mover can include an internal combustion engine or a hybrid drive, and the clutch can constitute a standard friction clutch, a magnetic powder clutch, a multiple-disc clutch, a torque converter with bypass clutch, or a clutch having means for compensating for wear upon its friction linings, pressure plate and/or other parts.

Another feature of the present invention resides in the provision of a wheeled motor vehicle which comprises a variable-RPM prime mover, a transmission having a plurality of selectable ratios, a torque transmitting clutch operating between the prime mover and the transmission and being engageable in dependency upon the RPM of the prime mover, and control means for at least partially disengaging the clutch when the RPM of the prime mover exceeds a preselectable threshold value. The threshold value is the momentary RPM which is ascertained on the basis of the momentary vehicle speed, the last-selected transmission ratio and a preselectable RPM for shifting the transmission into a higher gear. The aforementioned preselectable RPM can be in the range of 200.

The novel features which are considered as characteristic of the invention are set forth in particular in the appended claims. The improved motor vehicle itself, however, both as to its construction and the modes of assembling and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

The single FIGURE of the drawing is a schematic partly elevational and partly sectional view of a power train which can be utilized in a motor vehicle and embodies one presently preferred form of the instant invention.

DESCRIPTION OF PREFERRED EMBODIMENTS

The drawing shows a motor vehicle including a power train which embodies the present invention. The power train includes a prime mover 1 (such as an internal combustion engine and hereinafter mostly referred to as "engine" for short), a torque transmitting device 2 (such as an engageable and disengageable friction clutch, e.g., a dry clutch or a wet clutch), a change-speed transmission 3, and a differential 4 with output shafts 5 for driven wheels 6. At least one of the wheels 6 can be equipped or combined with an RPM sensor (not shown) which monitors the speed and transmits signals denoting the speed of the respective wheel. One or more additional RPM sensors can be provided to monitor the speed(s) of one or more additional constituents of the power train, e.g., an RPM sensor can be functionally associated with an antiblock braking system (ABS) or with another electronic unit.

In lieu of an internal combustion engine, the prime mover 1 can include or constitute a hybrid drive, e.g., a drive including an electric motor, a flywheel combined with a freewheel and a combustion engine.

The illustrated clutch 2 is a friction clutch; however, the improved power train can also employ a magnetic powder clutch, a multiple disc clutch, a torque converter with bypass clutch or another arrangement which is engageable to transmit torque with or without slip. A suitable clutch can further comprise means for automatically compensating for wear upon its component parts, e.g., upon the pressure plate, the friction linings and other constituents. Reference may be had, for example, to commonly owned U.S. Pat. No. 5,409,091 granted Apr. 25, 1995 to Reik et al. for "AUTOMATICALLY ADJUSTABLE FRICTION CLUTCH".

The power train further comprises a control unit 7 and an actuator 8 which is arranged to change the condition of the clutch 2 in response to signals from the corresponding output(s) of the control unit 7.

The illustrated clutch 2 is mounted on or is otherwise operatively connected with an engine-driven flywheel 2a, e.g., a composite flywheel having a primary rotary mass, a secondary rotary mass and a damper between the two masses. One of the masses can be provided with a starter gear 2b. Reference may be had, for example, to commonly owned U.S. Pat. No. 5,382,193 granted Jan. 17, 1995 to Friedmann et al. for "APPARATUS FOR DAMPING VIBRATIONS". The clutch 2 further comprises a clutch plate or clutch disc 2c having friction linings which are contacted by a pressure plate 2d and by the secondary mass of the flywheel 2a when the clutch disc is to transmit torque between the engine 1 and the transmission 3. The pressure plate 2d and the customary diaphragm spring 2f are confined in a clutch cover or housing 2e. If the clutch is of the type disclosed, for example, in the aforementioned U.S. Pat. No. 5,409,091 to Reik et al., it further comprises a sensor which monitors one or more parameters (such as force and/or distance) and effects an adjustment (e.g., of the pressure plate relative to the flywheel) when the change(s) of the monitored parameter(s) indicates or indicate that a compensation for wear is advisable or necessary.

The actuator 8 can engage, partially engage or disengage the clutch 2 by way of a device 9 (e.g., a central device cooperating with a release bearing 10 which is movable axially with and/or relative to the prongs of the diaphragm spring 2f by a fluid-operated system 11 including a master cylinder and a slave cylinder). The just described operative connection between the actuator 8 and the clutch 2 can be replaced by other (such as purely mechanical) motion transmitting arrangements (e.g., with a release bearing or an equivalent part which can receive motion by way of a pivotable lever or the like) without departing from the spirit of the present invention.

The actuator 8 is further operatively connected (by way of its single signal transmitting line or two or more signal transmitting lines) with the transmission 3, e.g., with a central selector shaft of the transmission. The operative connection between the actuator 8 and the transmission 3 can shift the transmission into a selected gear, into neutral or from a first gear into a different second gear. To this end, the actuator 8 can move the central selector shaft, one or more switching rods or other mobile part or parts of the transmission 3.

The actuator 8 can constitute a controller drum type actuator which is installed in the transmission 3. Such drum-shaped actuator can be driven to turn and to thus actuate elements which are installed in guides and the movements of which initiate a shifting of the transmission into desired gears or speeds. Still further, the actuator for the transmission 3 can include or encompass an actuator for the clutch 2 or an equivalent thereof; in such embodiment of the actuating means for the clutch 2 and the transmission 3, there is provided an operative connection between the actuator for the transmission and the clutch actuating means.

The control unit 7 is connected with the actuator 8 by a conductor 12 which serves to transmit and/or exchange and/or receive actuator-controlling sensor-generated signals denoting the condition of the interconnected parts. Additional signal-transmitting conductors 13, 14 are provided to establish temporary and/or permanent connections between the control unit 7 and additional sensor(s) and/or electronic unit(s). For example, at least one of the connectors 13, 14 can establish a connection between the control unit 7 and the engine electronics, between the control unit 7 and an electronic antilock braking system (ABS) and/or between the control unit 7 and an electronic antiskid or antispin or antislip system.

Additional sensors which are or which can be utilized in conjunction with the control unit 7 can be designed to monitor and to furnish signals denoting the general operative condition of the motor vehicle. For example, such additional sensors can serve to transmit signals denoting the RPM of the output element of the engine 1 and/or of the wheels 6, the position of the flap of the throttle valve for the engine, the position of the gas pedal and/or other parameters.

The signal transmitting conductor 15 connects the control unit 7 with a data bus, e.g., a CAN bus which can furnish system data pertaining to the motor vehicle or other electronic units because, as a rule, the electronic units are connected to each other by way of computer means.

An automated transmission (3) can be operated to shift into selected gears in response to initiation by the operator of the motor vehicle, e.g., the operator can actuate a switch which serves to shift the transmission into a higher or lower gear. Alternatively, the transmission actuating means can employ an electronic shifting lever which is set up to transmit a signal indicating that gear or speed into which the transmission is to be shifted. Still further, an automated transmission can also operate, for example, with resort to characteristic values, characteristic curves and/or characteristic fields on the basis of sensor signals to automatically effect a change of gears at certain selected points or stages without necessitating an initiation and/or other intervention (gear shift) by the operator of the motor vehicle.

The motor vehicle is preferably equipped with an electronic gas pedal 23 or with a load lever. The illustrated gas pedal 23 cooperates with a sensor 24 which transmits, via conductor means 25, signals to the corresponding input of an electronic control device or unit 20 for the engine 1. Signals (via conductor means 21) from the control device 20 to the engine 1 control or regulate, for example, the supply of fuel, the timing of ignition, the duration of fuel injection and/or the position of the flap of the throttle valve. The electronic control device 20 further receives signals from the control unit 7 (see the connection 22). The reference character 30 denotes a further control unit which is operatively connected with the control unit 20 and/or 7 and serves to regulate the transmission 3. The engine 1 is preferably equipped or cooperates with a throttle valve which is operated by an electric motor, and the position of the mobile flap of such valve is regulated by the control unit 20 for the engine 1. Such power trains need not or should not be provided with a direct mechanical connection to the gas pedal 23.

If the transmission 3 is a mechanical gearbox, the motor vehicle can employ a manually operable gear shift lever. Such lever is provided or cooperates with a first sensor which transmits signals denoting the selected (actual) gear ratio, and a sensor denoting the intended gear ratio. The second sensor serves to transmit signals which indicate the intention of the operator of the motor vehicle by indicating the nature of movement of the lever and/or the magnitude of the applied force. The arrangement can be such that the second sensor detects (a) the position(s) of one or more components which are confined in the transmission case and/or (b) the mementary gear of the transmission so that the control unit 30 receives appropriate signals denoting the already selected gear or the gear which is to be selected. If the second sensor is an analog sensor, it can also detect movements of mobile parts in the transmission case to thus ensure timely determination of the gear into which the transmission 3 is about to be shifted.

It has been ascertained that the power train which embodies the present invention can employ and preferably employs a transmission or transmission arrangement which can be shifted into different gears, either stepwise of infinitely, to thus establish different ratios between the two shafts. The term "automatic transmission" or "automated transmission" is intended to denote, in the power train of the present invention, particularly a torque transmitting arrangement wherein the gear shifting operations are automated and can be carried out with or without an interruption of traction.

Furthermore, and as utilized herein in connection with the operation of the transmission 3, the terms or expressions "selected gear" and "gear ratio" are intended to denote conditions or settings in which the transmission can transmit engine torque either at a number of fixed speeds or at any one of a practically infinite number of different speeds.

As concerns the electronic control and/or regulating arrangements and the associated sensors and actuators, as well as the corresponding control and/or regulating undertakings in automotive vehicles employing automatic clutches and transmissions, reference should be had to German patents Nos. 40 11 850 A1 and 44 26 260 A1 as well as to European patent No. 1 010 606 A1.

In a specific embodiment of the present invention, the desired transmission ratio is determined on the basis of the selected (active) gear. For example, if it is intended to shift the transmission from third gear into second gear at a vehicle speed v=50 km/h, while the overall transmission i2=8 (differential and transmission) and the rolling radius r of the driven wheels equals 0.2 m, the limit rotational speed $nG==v*i2/(r*2*\pi*60)=5305$ 1/min. If the operator were to unintentionally shift into first gear (i1=12), it would be necessary to operate with a rotational speed of 7958 1/min, i.e., approximately 8000 1/min. Such speed could not be reached because the clutch 2 would become disengaged again in view of the fact that the rotational speed of 5305 1/min revolutions is exceeded. For example, the selected gear can be ascertained with an automatic gear recognizing or detecting arrangement or by resorting to an arrangement which monitors the intended shift of the transmission into a particular gear. Reference may be had, for example, to the aforementioned German patent No. 40 11 850 A1 which fully discloses such gear recognizing or detecting arrangements.

In accordance with a further feature of the present invention, shifting of the transmission is limited to those gears which are immediately adjacent to an active gear. For example, if the transmission is in the gear 2 of a series of gears P, R, N, D, 2, 1, it can be shifted into gear 1 or into gear D.

The threshold value for shifting of the transmission into a higher gear is the momentary rotational speed of the engine which is determined by the momentary speed of the motor vehicle, the last-selected transmission ratio and a preselectable rotational speed. The preselectable rotational speed ($n_v$) is preferably in the range of (i.e., approximately) 200 revolutions per minute.

For example, if the vehicle speed v=80 km/h, and the transmission 3 is accidentally shifted from second gear into first gear, and if the overall transmission i2 for the second gear equals 8 while the rolling radius r is 0.2 m and the preselectable rotational speed $n_v$=200 1/min, then the threshold rotational speed $nG=v*i2/(r*2*\pi*60)+200=8688$ 1/min. In the first gear, with i1=12, the engine would turn at 13000 revolutions per minute which would be highly likely to result in damage. Such problems are overcome with the advent of the present invention because the clutch 2 is already disengaged at a threshold speed of approximately 8700 revolutions per minute.

In determining the threshold value, it should be taken into consideration whether the threshold value was reached already during shifting out of the last selected gear or prior to start of shifting into the next gear. For example, such situation is especially likely to arise if, at the time of disengagement of the clutch, the engine torque is still relatively high, e.g., if the engine torque is above the transmittable clutch torque; under such circumstances, the engine RPM can increase, at least slightly, during disengagement of the clutch. If such is the case, the clutch remains disengaged until the engine RPM has again decreased to the value which existed during the last disengagement of the clutch. It is also possible to ensure that, under the just outlined circumstances, the clutch is not fully engaged (e.g., so that it operates with considerable slip) and can only transmit a relatively small torque. However, it is of advantage to ensure that the clutch is at least slightly engaged when the engine RPM reaches a threshold value.

An important advantage of the improved motor vehicle and of its power train is that a shifting of the transmission into a wrong gear is detected with a minimum of delay. This, in turn, results in reliable prevention of overspeeding of the engine. In addition, the wheel braking torque for acceleration of the engine is shortened as concerns its duration as well as regarding its magnitude. Still further, one can rapidly detect improper functioning of the automatic transmission (known as ASG) and of the electronics of gear recognition in connection with electronic clutch management (ECM).

To summarize: The improved power train can be designed in such a way that, in a first embodiment, the control means which serves to prevent overrevving of the prime mover 1 of the power train includes means (7–12) for effecting an at least partial disengagement of the clutch 2 (i.e., disengagement of the clutch or an operation of the clutch with slip) when the RPM of the prime mover exceeds a preselectable threshold value which is ascertained on the basis of the momentary speed of the motor vehicle, or on the basis of a signal representing the momentary speed, and the momentary (prevailing) ratio or the sought-after ratio of the transmission. The control means can include means for ascertaining the momentary ratio of the transmission 3 on the basis of the previously selected effective gear. In accordance with a more specific embodiment of the invention, the sought-after ratio of the transmission 3 is one of the two gears neighboring the momentarily effective (previously selected) gear.

In accordance with a further embodiment, the control means is arranged to at least partially disengage the clutch 2 when the RPM of the prime mover 1 exceeds a preselectable threshold value (e.g., 200 RPM or thereabout), namely the momentary RPM which is ascertained on the basis of the momentary speed of the motor vehicle, the last selected ratio of the transmission 3 and a preselected RPM for shifting the transmission into a higher gear.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of motor vehicles with overspeed protectors for their prime movers and, therefore, such adaptations should and are intended to be comprehended within the meaning and range of equivalence of the appended claims.

What is claimed is:

1. A wheeled motor vehicle, comprising:

a variable-RPM prime mover;

a transmission having a plurality of ratios;

a torque transmitting clutch installed between said prime mover and said transmission, said clutch being engageable in dependency upon the RPM of the prime mover; and control means for preventing overrevving of the prime mover, including means for effecting one of a disengagement of the clutch and an operation of the clutch with slip when the RPM of the prime mover exceeds a preselectable threshold value, said threshold value being ascertained on the basis of at least one of (a) the momentary speed of the motor vehicle, the RPM of the wheels of the motor vehicle and a parameter denoting the momentary speed of the motor vehicle, and (b) a signal representing one of the momentary and sought-after ratios of the transmission, wherein:

said control means further includes means for ascertaining said momentary ratio of the transmission on the basis of the previously selected ratio of the transmission.

2. The motor vehicle of claim 1, wherein said sought-after transmission ratio is one of the ratios immediately adjacent the previously selected effective ratio.

3. The motor vehicle of claim 1, wherein said prime mover includes one of an internal combustion engine and a hybrid drive.

4. The motor vehicle of claim 1, wherein said clutch is one of a friction clutch, a magnetic powder clutch, a multiple-disc clutch, a torque converter with bypass clutch and a clutch having means for compensating for wear upon its parts.

5. The motor vehicle of claim 1, wherein said threshold value is the momentary RPM of the wheels of the motor vehicle ascertained on the basis of the momentary vehicle speed, the last-selected transmission ratio and a preselectable RPM of the prime mover for shifting the transmission into a higher gear.

6. The motor vehicle of claim 5, wherein said preselectable RPM of the prime mover at least approximates 200.

* * * * *